July 31, 1928.
M. GILBERT
MEASURING DEVICE
Filed Oct. 4, 1926
1,679,157
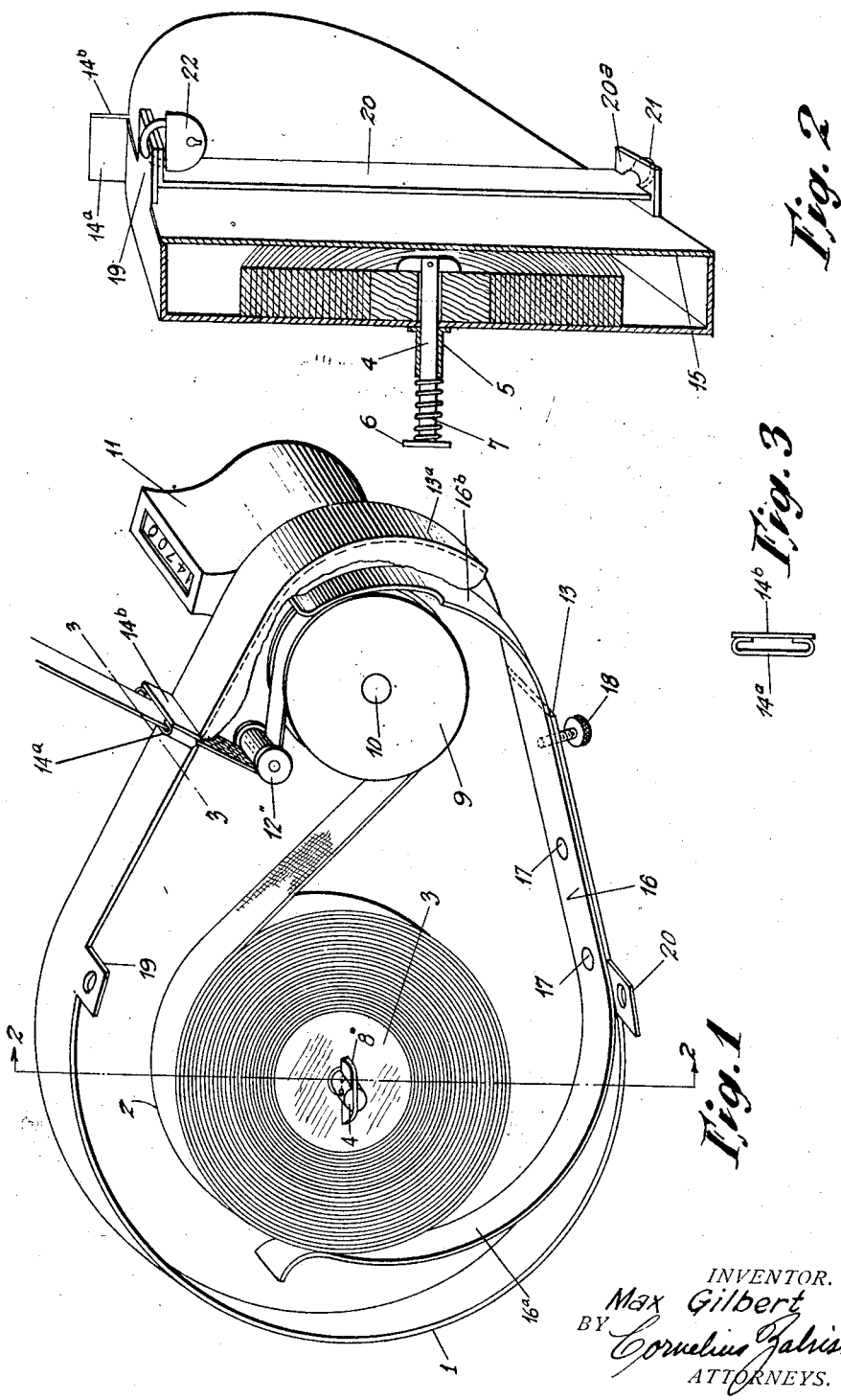
INVENTOR.
Max Gilbert
BY Cornelius Zabriskie
ATTORNEYS.

Patented July 31, 1928.

1,679,157

UNITED STATES PATENT OFFICE.

MAX GILBERT, OF BRONX, NEW YORK, ASSIGNOR TO GILBERT BINDOMETER CORPORATION, OF BROOKLYN, NEW YORK, A CORPORATION OF NEW YORK.

MEASURING DEVICE.

Application filed October 4, 1926. Serial No. 139,285.

This invention is a measuring device primarily adapted for use in clothing and shoe factories. In the manufacture of clothing and shoes, and more particularly in the latter art, great quantities of braid or tape are used as bindings around raw edges of shoe tops, straps, etc. This braid or tape is generally silk of expensive character and constitutes an important consideration in the manufacturing of large quantities of shoes.

It has heretofore been the practice to provide machine operators, whose duty it is to incorporate the tape or braid in the shoe construction, with large rolls of this braid to be used in carrying out their work. Such operators are, as a general rule, relatively careless in the use of materials and large quantities of braid are commonly wasted due to uneconomical cutting. Furthermore, the rolls of braid generally lie loosely on the machine and not infrequently they fall off on the floor or become tangled up in the machinery, so that in this and other ways well known to the art, large quantities of this expensive braid are lost to the manufacturers.

The primary object of the present invention is to overcome this waste and loss and to further provide a means for accurately checking up the operation in the use of the materials under consideration in order that operators may be taught economy and such economy enforced.

A further object of the invention is to provide a convenient holder or receptacle in which a roll of tape or braid may be enclosed and from which it may be drawn as required.

In practically carrying out the invention, this receptacle or casing is provided with a suitable mounting whereby it may be supported on the machine in a convenient accessible position. The casing is provided with an outlet through which the braid is drawn and within the casing is positioned a measuring wheel, actuated by withdrawal of the tape and having associated therewith an indicating device. The measuring wheel and indicating device are so constituted that as the braid is drawn from the casing, the indicator will accurately indicate the yardage thus withdrawn. In order to provide against slipping of the braid with respect to the measuring wheel, suitable means is provided for insuring that the circumferential movement of the wheel will correspond to the linear feed of the braid. This means may partake of various forms, but I find it convenient in practice to employ a relatively long double ended leaf spring, one end of which forces the braid into tight frictional engagement with the measuring wheel, while the other end of the spring serves to brake the braid roll, so that the braid will not be fed any faster than it is actually withdrawn from the casing by the operator.

The device is extremely simple, but is highly economical and fulfills a long felt want in the trade.

Features of the invention, other than those specified, will be apparent from the hereinafter detailed description and claims, when read in conjunction with the accompanying drawings.

The accompanying drawings illustrate one practical embodiment of the invention, but the construction shown therein is to be understood as illustrative, only, and not as defining the limits of the invention.

Figure 1 shows the device of the present invention with the cover of the casing removed.

Figure 2 is a section perspective, the section being taken on the line 2—2 of Figure 1; and, Figure 3 is an elevation showing the outlet as viewed from the plane of the line 3—3 of Figure 1, as the parts appear when the cover is in place.

Referring to the drawings, 1 indicates a suitable casing, which is shown as sufficiently large to receive within its confines a conventional roll of braid 2. The casing is made of just sufficient depth to conveniently enclose the roll of braid and the associated operating parts.

The roll of braid 2 embodies the usual core 3, which is perforated to provide a support for the roll. This perforation is adapted to be passed over a spindle 4 which is mounted in a boss 5 on the casing, as shown in Figure 2. The outer end of the spindle is provided with a head 6 and between the head 6 and the boss 5 is a coiled spring 7. The opposite end of the spindle is bifurcated and in the opening thereof is pivoted a finger 8. This finger may be moved into alinement with the axis of the spindle to permit the spindle to be passed through the perforation of the braid roll, whereupon the finger is moved into transverse position, as shown in Figure 2 and the spring 7 will draw the finger into engagement with the core 3 and hold the roll of braid firmly within the casing for rotation on the spindle 4.

Mounted adjacent the opposite end of the casing and interiorly thereof is a measuring roll 9. This roll is fixed to a shaft 10 which is journalled in the wall of the casing and constitutes the operating shaft of a counter or indicator 11. This indicator 11 may be of any suitable conventional type, but the counting mechanism thereof is preferably so marked as to indicate yards, the size of the measuring roll 9 being proportioned to properly actuate the indicator to give correct measuring.

Braid is passed from the roll 2 about the measuring roll 9 and thence about a directional roll 12″ to and through a tubular outlet mouth 14 formed by two parts 14$^a$ and 14$^b$. The part 14$^a$ is carried by the casing 1 and has an open side, as shown in Figure 1, so that the braid can be inserted into the outlet mouth section 14$^a$ without requiring threading of the braid. The other section 14$^b$ of the outlet mouth is formed on the cover 15 of the casing as will presently be described.

It will appear from the description, as thus far advanced that as the braid is drawn through the outlet mouth by an operator, it will rotate the measuring wheel 9 and operate the indicator 11. In order that the indication may be accurate, it is essential that there be no slip between the wheel 9 and the brake. It is further essential to the proper operation of the device that there be no appreciable slack between the roll 2 and the wheel 9. In order to insure proper operation at all times, I provide suitable means for braking the roll 2 and for insuring adhesion of the braid to the wheel 9. This means may conveniently take the form of a double ended leaf spring 16 secured to the casing by rivets 17, as shown in Figure 1.

One end 16$^a$ of the leaf spring is bent to engage with and brake the roll 2, while the other end 16$^b$ of the spring is shaped to partially embrace the wheel 9 and hold the braid in tight frictional engagement therewith. This latter frictional engagement may be regulated by means of a thumb screw 18 threaded through the casing and bearing against the portion 16$^b$ of the spring. By adjusting this thumb screw, the tension of the spring upon the braid may be accurately controlled, so that accurate indication of the length of braid withdrawn from the casing may be assured.

The open side of the casing is closed by the cover 15 which, as stated, carries an outlet mouth section 14$^b$. It will be noted from the drawings that the wall of the casing is cut away at one end, as at 13, and this cut away portion would have extended around the small end of the casing to the outlet mouth. The cover is provided with a flange 13$^a$ which corresponds to the cut out portion of the casing wall and one end of this flange is bent up to form the section 14$^b$ of the outlet mouth. When the cover is in place, it closes the open side and end of the casing and the section 14$^b$ abuts the open side of the section 14$^a$, and forms therewith a complete mouth through which the braid is drawn. The cover may be conveniently maintained in position by forming on the casing laterally extending perforated tongues 19 and 20 and bringing a locking bar 20 into cooperation therewith after the cover is in position. The locking bar is shown as provided at one end with a hook 21 adapted to engage with the perforation of the tongue 20$^a$ and the opposite end of the locking bar has a perforation which is adapted to register with the perforation in the tongue 19 in order that a padlock or other suitable locking device 22 may be passed through the perforations to lock the door in position. So long as the bar is in position, the cover cannot be removed and the theft of braid is thereby rendered impossible.

It is the practice to have the foreman or one in charge of stock supply the casings of the several machines of a factory from time to time and no other unauthorized person can have access to the braid.

In practice, the casing is provided with any suitable means preferably a bracket, by means of which it can be mounted directly upon a machine in a detachable manner to enable the casing to be removed and taken to the stock room for replenishing.

In the manner described, the loss of braid is practically eliminated and the executives are able to check up from time to time upon the workmen in such manner as to preclude waste of the material under consideration.

The drawings show the cover as locked in place by the locking bar, but, if desired, the cover may be secured in place in any suitable manner without departing from this invention.

The foregoing detailed description sets forth the invention in its preferred practical form, but the invention is to be understood as fully commensurate with the appended claims.

Having thus fully described the invention, what I claim as new and desire to secure by Letters Patent is:

1. In a device of the character described, a normally closed and locked casing provided with an outlet mouth, means for supporting within the casing a roll of braid for rotation, a measuring indicator mounted on the exterior of the casing and having an operating shaft extending into the interior thereof, a measuring wheel secured to the indicator shaft and positioned within the casing, said wheel being positioned so that braid extending from the roll to the outlet mouth will be looped about the measuring wheel, means for holding the braid firmly against the circumference of the measuring wheel to preclude slipping of the braid with respect to said wheel, and means for braking the roll of braid.

2. In a device of the character described, a casing provided with an open side, a cover for closing said side, an outlet mouth in two sections, one of which is carried by the casing and the other of which is carried by the cover, whereby the braid may be positioned in said mouth, without threading, when the cover is removed, means for supporting a roll of braid within the casing for rotation, a measuring wheel positioned within the casing and about which braid in its passage from the roll to the outlet mouth is adapted to be looped, indicating means operatively connected to and operated by the measuring wheel, and means for precluding slippage between the braid and said wheel.

3. In a device of the character described, a casing provided with an open side, a cover for closing said side, an outlet mouth formed in the casing, means for supporting a roll of braid within the casing for rotation, a measuring wheel positioned within the casing and about which braid in its passage from the roll to the outlet mouth is adapted to be looped, measure indicating means operatively connected to and operated by the measuring wheel, a double ended leaf spring, one end of which bears against the measuring wheel to preclude slippage between the braid and said wheel, and the other end of which bears against the roll of braid to brake said roll.

4. In a device of the character described, a casing provided with an open side, a cover for closing said side, an outlet mouth formed in the casing, means for supporting a roll of braid within the casing for rotation, a measuring wheel positioned within the casing and about which braid in its passage from the roll to the outlet mouth is adapted to be looped, measure indicating means operatively connected to and operated by the measuring wheel, a double ended leaf spring, one end of which bears against the measuring wheel to preclude slippage between the braid and said wheel, and the other end of which bears against the roll of braid to brake said roll, and means for normally locking the cover in position to preclude unauthorized access into the casing.

5. In a device of the character described, a relatively shallow casing provided with an open front, a closed back and an outlet mouth, a spindle extending into the casing from the back thereof for supporting a roll of braid within the casing for rotation, a measuring wheel positioned within the casing and about which braid in its passage from the roll to the outlet mouth is adapted to be looped, a measuring indicator positioned exteriorly of the casing and having a shaft operatively connected to and operated by the measuring wheel, and a cover for normally closing the open front of the casing, whereby, when the cover is open, a roll of braid may be readily slipped over the spindle and the free end of the braid led about the measuring wheel through the outlet.

6. In a device of the character described, a relatively shallow casing provided with an open front, a closed back and an outlet mouth, a spindle extending into the casing from the back thereof for supporting a roll of braid within the casing for rotation, a measuring wheel positioned within the casing and about which braid in its passage from the roll to the outlet mouth is adapted to be looped, a measuring indicator positioned exteriorly of the casing and having a shaft operatively connected to and operated by the measuring wheel, a cover for normally closing the open front of the casing, whereby, when the cover is open, a roll of braid may be readily slipped over the spindle and the free end of the braid led about the measuring wheel through the outlet, a double ended leaf spring, one end of which bears against the measuring wheel to preclude a slippage between the braid and said wheel, and the other end of which bears against the roll of braid to brake said roll, and means for adjusting the tension of said spring.

7. In a device of the character described, a casing provided therein with a braid roll support on which rolls of braid may be successively detachably supported for unwinding and discharge from the casing, an outlet mouth through which said discharge of the braid is effected, a measuring counter to indicate the aggregate amount of braid fed from said rolls in succession, a spindle for operating the counter, and a measuring wheel interiorly of the casing and mounted on the spindle and about which a portion of the braid between the roll and the outlet mouth is looped, said wheel being rotatable by the braid, as said braid is withdrawn from the casing, for operating the counter.

In testimony whereof I have signed the foregoing specification.

MAX GILBERT.